United States Patent Office 2,772,879
Patented Dec. 4, 1956

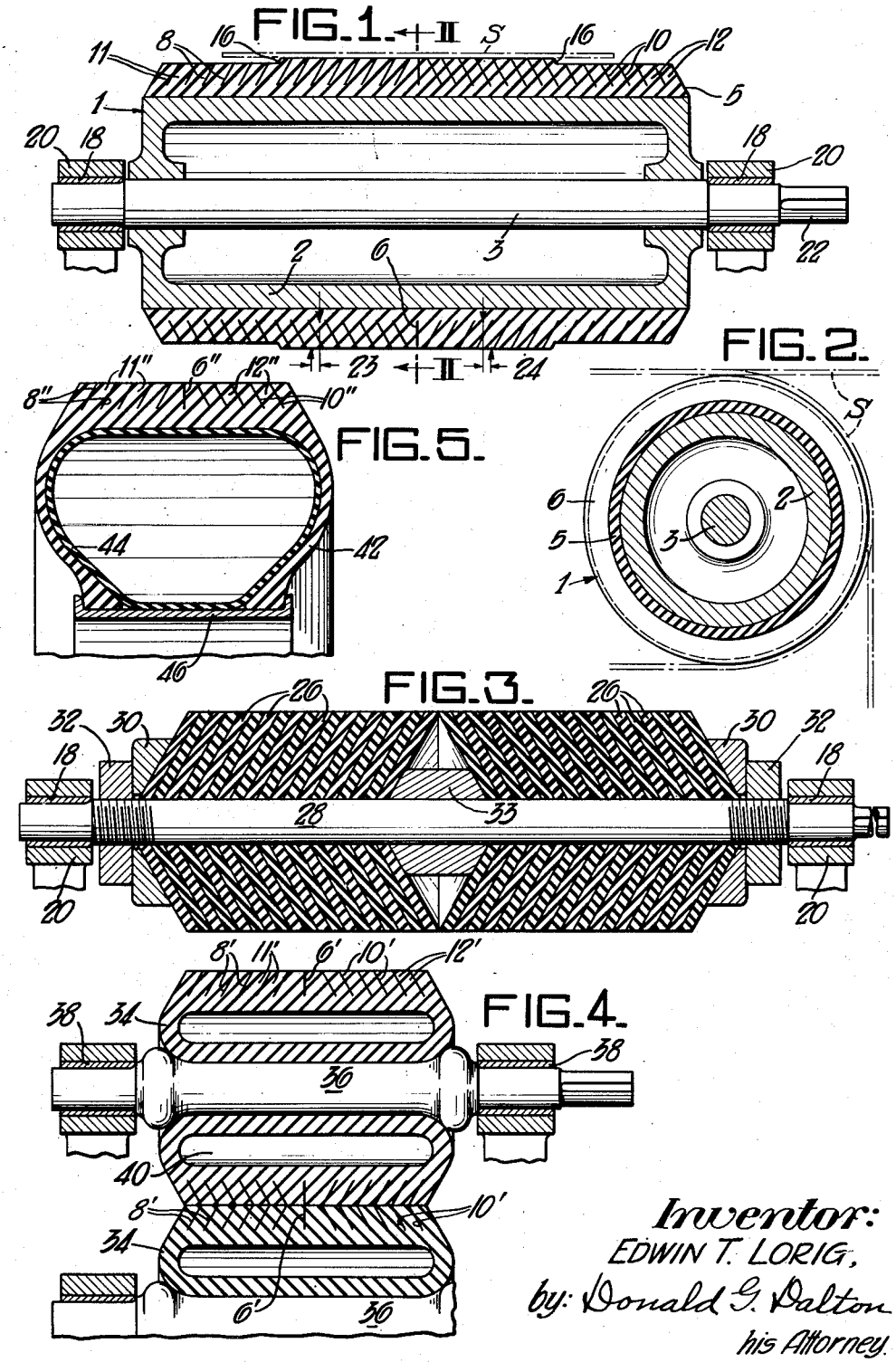

2,772,879

AUTOMATIC CENTERING APPARATUS

Edwin T. Lorig, Pittsburgh, Pa., assignor to United States Steel Corporation, a corporation of New Jersey Application September 17, 1953, Serial No. 380,646

3 Claims. (Cl. 271—2.6)

This invention relates to automatic centering apparatus such as apparatus for positioning a moving object, especially strip and strip-like materials, and is an improvement on the apparatus disclosed in my Patent No. 2,592,581, dated April 15, 1952. The apparatus shown in my patent is satisfactory for most purposes and has proved to be better than the apparatus previously used for positioning moving objects. The apparatus shown therein depends upon progressive deflection of the flexible projections arranged on the outer periphery of the roll through approximately one-half their arc of contact with the moving object. Prior to the development of the present invention it was believed that a space had to be provided between the projections in order for the roll to operate satisfactorily. Much to the amazement of those skilled in the art I have discovered and demonstrated that it is not necessary to have a space between the projections to permit the projections to open up slightly and then to deflect properly immediately ahead of and following the initial line of contact with the moving object. On the contrary I have found that by taking a roll made of rubber or rubber-like material and merely slitting or laminating the roll properly without removing material therefrom results are obtained which are better for many purposes than those obtainable with my previous apparatus. In the patented roll the transverse force tending to move the object gradually toward the center increases in magnitude from the end of the roll toward the center through a substantial arc of contact following the initial line of contact of the object while in the present roll the forces remain more uniform throughout its width and continue only for a very small arc after initial contact. In fact the roll disclosed in my patent allows lateral slippage or movement to occur between the projections and the strip in arced contact for a considerable portion of the arc not only after the initial line of contact with the object but also in the arc of contact before delivery during which latter action the projections gradually relieve themselves of the contact pressure applied, thus moving outwardly from the center line for repositioning under no load for the next cycle of operations. In my new roll the major lateral movement of the laminations occurs in a comparatively small portion of the arc of contact at the line of approach of the object with substantially no further lateral movement during the remaining portion of the arc of contact, thus insuring the greatest area of stationary contact, relatively speaking, between the strip and the roll which results in the greatest possible static frictional effect between the laminated roll surface and the strip. Furthermore, in my patented roll there is a progressive reverse lateral force generated at each end of the roll tending to move the object off the roll if the outermost edge of the object on one side contacts the end of the roll. Thus it was necessary to provide a roll of sufficient width that this force could not move the object from the roll or to provide a rigid disc on the ends of the roll to prevent this force from acting. The amount of load my patented roll can stand is limited and it is not suitable for carrying very heavy loads without securing excessive friction and resultant wear between adjacent projections. Also, it is not suitable for use in pinch roll assemblies because of excessive distortion and wear of the projections at the line of contact. The radius of my patented roll will change materially when an object passes thereover and such change in radius is sometimes undesirable. Because of the space between the projections in my patented roll and because of excessive distortion at the contacting surface of the projections the article passing thereover may become marked in certain instances. When a thin web-like film is being conveyed there is danger of a gathering action taking place at the center tending to cause overlap or bunching up of the center fibres of the film. These tendencies are lessened by providing sponge rubber between the projections as shown in my above mentioned patent, but in the case of heavy loads sponge rubber will be compressed to such an extent by the progressive deflection of the projections that it will bulge out and mark the object passing thereover.

It is therefore an object of my invention to provide apparatus for positioning moving objects which is suitable for both heavy and light loads, which will not mark the object passing thereover and which provides good frictional contact with the object over substantially its full area of contact.

Another object is to provide apparatus for positioning long lengths of thin web-like films which have little or no strength and lateral stiffness.

These and other objects will be more apparent after referring to the following specification and attached drawings, in which:

Figure 1 is a transverse sectional view of one embodiment of my invention;

Figure 2 is a sectional view taken on the line II—II of Figure 1;

Figure 3 is a view similar to Figure 1 showing a modification of my device;

Figure 4 is a sectional view showing another modification; and

Figure 5 is a sectional view showing still another modification.

Referring more particularly to Figures 1 and 2 of the drawings, the reference numeral 1 indicates a rotatable roll over which a strip or strip-like material S passes. The strip S may pass over the roll either in substantially line contact therewith or around a substantial arc thereof. The roll is preferably made of a metal core 2 mounted on a shaft 3 and covered with a shell of rubber or rubber-like material 5 having a radial slit 6 around its periphery on the transverse center of the roll. A plurality of slits 8 and 10 are provided on opposite sides of the slit 6 and form a plurality of closely spaced laminations 11 and 12, respectively. These slits are inclined downwardly from the surface of the roll away from the transverse center thereof. The slits 6, 8 and 10 are provided in the sleeve 5 by means of a razor blade or other sharp thin tool which will not remove any substantial amount of material, thus resulting in a slicing action rather than grooving. The roll may be cylindrical, concave or convex, as described, to suit various installations. Also, the center portion of the roll might be made cylindrical and of a greater diameter than the ends of the roll to provide shoulders 16. The slits 8 and 10 are preferably arranged at an angle of between 45 and 89° to the axis of the roll and are preferably uniformly spaced relatively close together. The roll shaft 3 is supported by means of axially aligned bearings 18 arranged in housing 20. An extension 22 is provided at one end of the shaft 3 when it is desired to drive or provide a drag on the roll.

When the roll is rotating at high speeds under no external pressure, centrifugal force will tend to move the separate sections or flexible laminations of the roll outwardly and when the strip S passes over the roll surface it will move the roll surface immediately adjacent the approach line of contact inwardly toward the axis of the roll and also toward the transverse center of the roll with an action similar to that of the roll in my above mentioned patent. However, the centering action of the present roll is not dependent upon this action. The present rolls provide centering regardless of centrifugal force, due to couples of force 23 and 24 at the surface of the cup-like laminations 11 and 12 and at the bottom of the slits 8 and 10. The couples 23 and 24 create opposed lateral forces on the surface of the roll, particularly at the approach line of contact, having components directed inwardly toward the transverse center of the roll. These forces are equal per unit area of strip in contact with the roll. As long as the strip is centered on the roll and the bearing pressure of the strip on the roll is uniform over its full width no lateral movement of the strip will occur when it is conveyed over the roll. If the strip is off center or the strip contact pressure is non-uniform from side to side the section of the roll having the greatest total area in contact with the strip and the greatest total pressure will force the strip toward the center. In other words if more of the strip is to the right of the transverse center line of the roll the total force on the strip tending to move the strip to the left will be greater than the total force tending to move the strip to the right and the strip will be forced to the left until it centers itself. The pressure between the laminations at slits 8 and 10 increases and decreases proportionately to the increase and decrease of surface pressure on laminations 11 and 12 throughout the area in contact with the strip. Therefore no substantial slippage occurs between adjacent laminations because of the angled slits 8 and 10 and the cup-like structure of laminations 11 and 12. The laminations 11 and 12 must deflect or move in unison because of the frictional effect between them caused by the increasing and decreasing lateral pressure in the slits throughout a given cycle of operation.

Figure 3 shows a second embodiment of my invention in which the roll is made up of a plurality of resilient discs or cone-like cups 26 mounted on a threaded shaft 28. The discs or cups 26 may be made of the same material as the sleeve 5 or may be made from fabrics or metal which are sufficiently flexible to deflect slightly under pressure. The discs 26 are cupped or inclined radially away from the shaft 28 toward the center line of the roll and are held in close engagement under pressure with each other without any substantial distance therebetween. In other words it is essentially an arrangement of a roll with slits as in the embodiment shown in Figure 1. An end clip 30 on each end of the shaft is held against the end disc 26 by means of a nut 32 which is threaded on the shaft 28, thus holding the discs or cups 26 in assembled position. A center spacer 33 is provided to assist in cupping the discs and for holding the cone-like cups in position at the transverse center of the roll. The operation of this device is the same as that of Figure 1.

In the embodiment of my invention shown in Figure 4 a roll body 34 made of rubber or rubber-like material is mounted on a shaft 36 which is supported in spaced bearings 38. The roll body 34 is provided with a chamber 40 which is filled with a fluid such as air, water or the like. The amount of fluid in the chamber 40 determines the amount of crown on the roll. This roll, like that of the roll of Figure 1 is provided with a radial slit 6' and angular slits 8' and 10' on opposite sides of the slit 6' which provides a plurality of closely spaced laminations 11' and 12'. The operation of this embodiment is the same as that of Figure 1, but it is particularly adapted for use in pinch rolls.

In the embodiment shown in Figure 5 a tire 42 is provided with the usual inner tube 44 and is mounted in the usual manner on a rim 46. The outer surface of the tire is arranged in the same manner as the outer surface of the rolls of Figure 4, that is it is provided with a radial slit 6" and angular slits 8" and 10" which form laminations 11" and 12". This tire may be used as a centering roll and will function in the same manner as the roll of Figure 4.

In some instances it may be desirable to provide rolls combining features of the rolls of my above mentioned patent and the rolls of the present invention. In so doing the slits 8 and 10 of the present invention would be provided in the projections 4 and 6 of the patent.

While several embodiments of my invention have been shown and described it will be apparent that other adaptations and modifications may be made without departing from the scope of the following claims.

I claim:

1. Apparatus for automatically centering an object passing thereover comprising a rotatable member having an outer peripheral surface adapted to contact said object, said member having a radial separation on a transverse central plane extending to its outer periphery, a plurality of flexible laminations of one material on its outer periphery arranged on both sides of said transverse central plane, means for causing said laminations to rotate in unison, said laminations normally being in contact with one another but being movable with respect to each other and being inclined radially toward the axis of the roll away from the said transverse central plane.

2. Apparatus for automatically centering an object passing thereover according to claim 1 in which the laminations are formed by means of a shaft, resilient discs mounted in abutting relationship on said shaft, the outer surface of said resilient discs forming the object supporting surface, said discs being inclined radially away from said shaft toward the said transverse central plane, and means for holding said discs on said shaft.

3. Apparatus for automatically centering an object passing thereover according to claim 1 in which the rotatable member comprises a resilient member having a fluid pocket therein, said laminations being supported on said resilient member.

References Cited in the file of this patent

UNITED STATES PATENTS 2,592,581    Lorig  ----------------  Apr. 15, 1952